US00RE43603E

(19) United States
(12) Reissued Patent
Coburn et al.

(10) Patent Number: US RE43,603 E
(45) **Date of Reissued Patent: *Aug. 28, 2012**

(54) DUAL FILTER VACUUM CLEANER APPARATUS

(75) Inventors: Eric Coburn, Coxhoe (GB); Danny Bone, Langley Moor (GB)

(73) Assignee: Black & Decker Inc., Newark, DE (US)

( * ) Notice: This patent is subject to a terminal disclaimer.

(21) Appl. No.: 12/288,313

(22) Filed: Oct. 17, 2008

Related U.S. Patent Documents

Reissue of:
(64) Patent No.: 6,546,592
Issued: Apr. 15, 2003
Appl. No.: 09/616,765
Filed: Jul. 14, 2000

U.S. Applications:
(63) Continuation of application No. 11/108,103, filed on Apr. 15, 2005, now Pat. No. Re. 40,542.

(30) Foreign Application Priority Data

Jul. 17, 1999 (GB) ..... 9916759

(51) Int. Cl.
*A47L 5/24* (2006.01)

(52) U.S. Cl. ..... 15/344; 15/347; 55/482; 55/487; 55/488; 55/497; 55/DIG. 3

(58) Field of Classification Search ..... 15/344, 15/347; 55/488, 487, 497, 482, 486, DIG. 3; 95/286; *A47L 5/24*
See application file for complete search history.

(56) References Cited

U.S. PATENT DOCUMENTS

| | | | | | |
|---|---|---|---|---|---|
| 924,334 | A | * | 6/1909 | Fouch | 301/64.5 |
| 1,719,072 | A | * | 7/1929 | Myers | 403/326 |
| 3,009,719 | A | * | 11/1961 | Otto et al. | 403/252 |
| 3,443,366 | A | * | 5/1969 | Schwab | 55/309 |
| 3,537,711 | A | * | 11/1970 | Walker | 277/642 |
| 3,621,640 | A | * | 11/1971 | Ohno et al. | 55/300 |

(Continued)

FOREIGN PATENT DOCUMENTS

GB 1262121 * 2/1972

(Continued)

*Primary Examiner* — David A Redding
(74) *Attorney, Agent, or Firm* — Harness, Dickey & Pierce, P.L.C.

(57) ABSTRACT

A dual filter arrangement for a vacuum cleaner for filtering particles of dust and debris from an airflow passing through the vacuum cleaner. The dual filter comprises a coarse pre-filter having an array of pores formed therein of substantially uniform diameter and a fine primary filter which is located rearwardly of the pre-filter in the direction of flow of the airflow. The dual filter is releasably latched to a main housing portion of the vacuum cleaner housing. A nose cone is removably secured to the housing and circumscribes the dual filter assembly. The dual filter enables even more efficient filtering of contaminants from dust and dirt entrained air ingested by the vacuum cleaner. Attachment of the dual filter to the main housing portion provides the additional advantage of increasing the capacity of the nose cone and eliminating the need for the user to handle the dual filter assembly when emptying contaminants collected within the nose cone. A unique seal arrangement provides a substantially airtight seal between the dual filter system and the main housing to which it is secured.

19 Claims, 7 Drawing Sheets

AMENDED

U.S. PATENT DOCUMENTS

| | | | | | |
|---|---|---|---|---|---|
| 3,894,377 | A | * | 7/1975 | Welch | 52/584.1 |
| 3,909,219 | A | * | 9/1975 | Fromknecht | 96/406 |
| 4,011,624 | A | * | 3/1977 | Proett | 15/344 |
| 4,042,999 | A | * | 8/1977 | Triantafyllou | 15/422 |
| 4,073,031 | A | * | 2/1978 | Schwartz | 15/373 |
| 4,105,420 | A | * | 8/1978 | Moore | 96/416 |
| 4,209,875 | A | * | 7/1980 | Pugh et al. | 15/344 |
| 4,213,224 | A | * | 7/1980 | Miller | 15/344 |
| 4,421,964 | A | * | 12/1983 | Buchtel | 200/332.2 |
| 4,473,316 | A | * | 9/1984 | Welch | 403/246 |
| 4,542,557 | A | * | 9/1985 | Levine | 15/344 |
| 4,573,234 | A | * | 3/1986 | Kochte et al. | 15/323 |
| 4,573,237 | A | * | 3/1986 | Kochte et al. | 15/344 |
| 4,577,365 | A | * | 3/1986 | Yuen | 15/339 |
| 4,592,764 | A | * | 6/1986 | Ikezaki et al. | 96/382 |
| 4,610,048 | A | * | 9/1986 | Ishihara et al. | 15/344 |
| 4,644,605 | A | * | 2/1987 | Joss et al. | 15/329 |
| 4,665,582 | A | * | 5/1987 | Richmond et al. | 15/344 |
| 4,670,701 | A | * | 6/1987 | Sako et al. | 320/115 |
| 4,682,384 | A | * | 7/1987 | Prahl et al. | 15/344 |
| 4,704,765 | A | * | 11/1987 | Ataka | 15/323 |
| 4,745,654 | A | * | 5/1988 | Yamamoto et al. | 15/344 |
| 4,800,614 | A | * | 1/1989 | Kopco et al. | 15/330 |
| 4,811,453 | A | * | 3/1989 | Lubraniecki | 15/347 |
| 4,821,366 | A | * | 4/1989 | Levine | 15/344 |
| 4,831,685 | A | * | 5/1989 | Bosyj et al. | 15/344 |
| 4,881,844 | A | * | 11/1989 | Tremblay | 403/315 |
| 4,894,882 | A | * | 1/1990 | Toya | 15/344 |
| 4,920,608 | A | * | 5/1990 | Hult et al. | 15/339 |
| 4,928,347 | A | * | 5/1990 | Krasznai et al. | 15/344 |
| 4,951,348 | A | * | 8/1990 | Krasznai et al. | 15/414 |
| 4,961,762 | A | * | 10/1990 | Howeth | 55/302 |
| 4,967,443 | A | * | 11/1990 | Krasznai et al. | 15/347 |
| 5,020,187 | A | * | 6/1991 | Kosten et al. | 15/347 |
| 5,025,529 | A | * | 6/1991 | Hult et al. | 15/344 |
| 5,056,186 | A | * | 10/1991 | Jiam-Fa | 15/328 |
| D355,482 | S | * | 2/1995 | Grigsby, Jr. | D23/365 |
| 5,561,885 | A | * | 10/1996 | Zahuranec et al. | 15/323 |
| 5,647,093 | A | * | 7/1997 | Engel et al. | 15/352 |
| 5,674,302 | A | * | 10/1997 | Nakayama et al. | 55/385.3 |
| 5,679,122 | A | * | 10/1997 | Moll et al. | 55/497 |
| 5,720,790 | A | * | 2/1998 | Kometani et al. | 55/497 |
| 5,820,646 | A | * | 10/1998 | Gillingham et al. | 55/488 |
| 5,976,225 | A | * | 11/1999 | Nystrom et al. | 95/278 |
| 6,110,248 | A | * | 8/2000 | Liu | 55/490 |
| 6,434,785 | B1 | * | 8/2002 | Vandenbelt et al. | 15/344 |
| RE40,542 | E | * | 10/2008 | Coburn et al. | 15/344 |

FOREIGN PATENT DOCUMENTS

| | | | |
|---|---|---|---|
| GB | 1504063 | * | 3/1978 |
| JP | 52-104361 | * | 9/1977 |

* cited by examiner

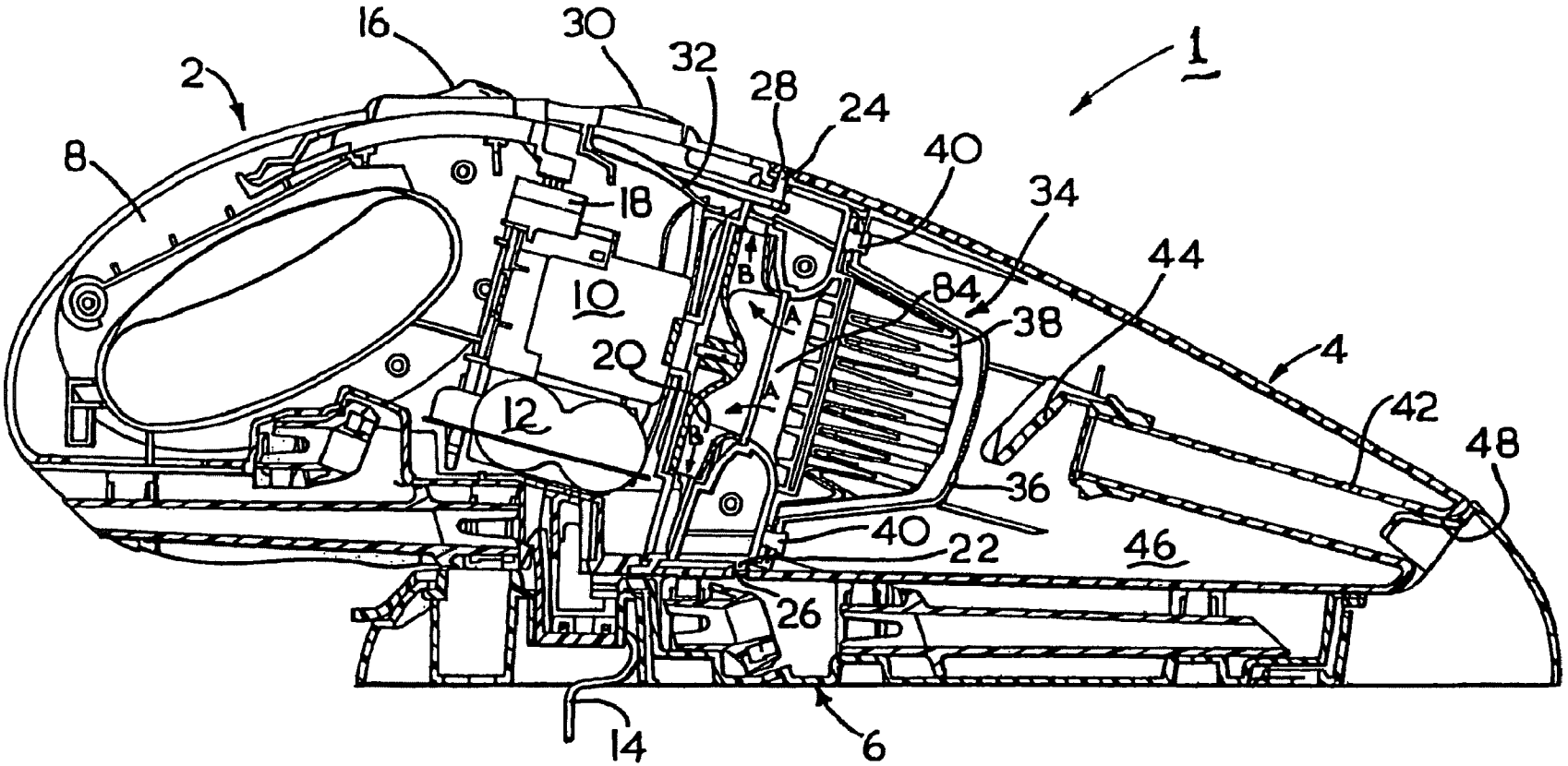
FIG. 1
AMENDED

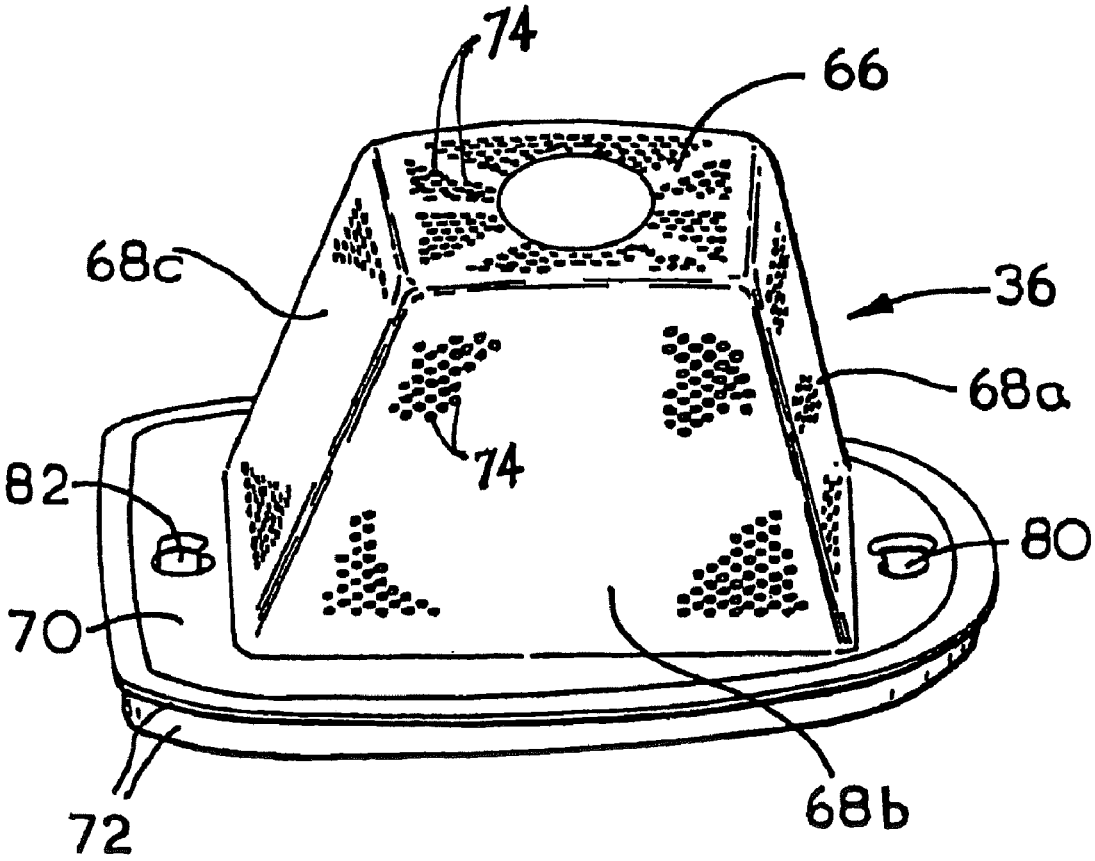
FIG. 5
AMENDED

DUAL FILTER VACUUM CLEANER APPARATUS

Matter enclosed in heavy brackets [ ] appears in the original patent but forms no part of this reissue specification; matter printed in italics indicates the additions made by reissue.

*CROSS-REFERENCE TO RELATED APPLICATION*

*This application is a continuation of U.S. application Ser. No. 11/108,103, filed Apr. 15, 2005, now U.S. Pat. No. Re. 40,542, which is a Reissue of U.S. Pat. No. 6,546,592 B1, issued Apr. 15, 2003, which claims priority to Great Britain application Serial No. 9916759, filed Jul. 17, 1999.*

TECHNICAL FIELD

The present invention relates to improvements in the filter arrangements used in vacuum cleaners, and in particular to improvements in the filter arrangements used in hand held battery operated vacuum cleaners.

BACKGROUND OF THE INVENTION

In many known vacuum cleaners a motor powered either by a mains electricity supply or a battery pack, which may be rechargeable, rotatingly drives a fan. The fan generates an airflow within which particles of dust and debris to be collected by the vacuum cleaner become entrained. The airflow generally enters the vacuum cleaner via an inlet nozzle and passes through a filter so that particles of dust and debris entrained in the airflow are removed from the airflow by the filter and are collected in a collecting chamber. A problem with this type of vacuum cleaner is that after some use the pores of the filter can become blocked by particles of dust and debris which tend to bind together to form relatively large conglomerations. Once the filter becomes blocked the airflow through it is reduced and the suction power of the vacuum cleaner is reduced.

In its simplest form the filter can be a piece of woven polyester material supported in a frame and located between a collecting chamber and the fan. Such a simple filter will filter out the majority of particles of dust and debris from the airflow drawn into the fan, some of which particles then drop into the collecting chamber. However, such simple filters do tend to become blocked relatively quickly and can be ineffective to filter out smaller particles of dust and debris from the airflow.

Improved filters are known in which the filter comprises an accordian-like or "concertina" of filter material, in order to increase the surface area of the filter while not taking up too much space within the vacuum cleaner. However, these can also become blocked through use and the folds in the concertina of filter material provide crevices in which conglomerations of particles of dust and debris can accumulate. In such filters the filter material has to be made of materials which maintain their shape once folded, which can increase the expense of the filter material used, particularly if a fine filter is required.

It is important that the filter arrangement used in the vacuum cleaner is effectively sealed within the housing of the vacuum cleaner so that none of the airflow within which dust and debris is entrained leaks around the sides of the filter. It is desirable that all the airflow through the fan passes through the filter so that all the particles of dust and debris entrained in the airflow are filtered out and collected in a collecting chamber. Such a seal for a filter will have to be effective throughout the lifetime of the vacuum cleaner and may have to withstand regular disassembly of the parts of the vacuum cleaner surrounding it in order that the collecting chamber can be emptied, and possibly so that the filter itself can be cleaned.

In some vacuum cleaners the filter is regularly removed from the housing of the vacuum cleaner so that it can be cleaned. In such vacuum cleaners it is desirable to be able to remove and replace the filter easily and without reducing the strength of any seal between the filter and components of the vacuum cleaner surrounding it. However, the need for the user to physically handle the filter element to clean same is a drawback.

A first aspect of the present invention seeks to overcome some of the problems discussed above by providing a filter arrangement for a vacuum cleaner which is less vulnerable to blocking by particles of dust and debris. A second aspect of the present invention seeks to overcome some of the disadvantages discussed above by providing a high surface area and low volume filter in which relatively inexpensive, flexible, fine filter material can be used. A third aspect of the present invention seeks to overcome some of the problems discussed above by providing a filter arrangement with improved sealing to adjacent components. A fourth aspect of the present invention seeks to overcome some of the disadvantages discussed above by providing a releasable fixing arrangement for a filter arrangement within a vacuum cleaner which is easy to operate and maintains a good seal around the filter arrangement when the arrangement is fixed within the vacuum cleaner.

SUMMARY OF THE INVENTION

According to a first preferred embodiment of the present invention there is provided a dual filter arrangement for a vacuum cleaner. The dual filter arrangement is effective for filtering particles of dust and debris from an airflow passing through the vacuum cleaner. The dual filter comprises a coarse pre-filter and a fine primary filter which is located rearwardly of the pre-filter in the direction of flow of the airflow.

Clearly, the pre-filter will prevent a proportion of the particles of dust and debris entrained in the airflow from reaching the primary filter and thus will reduce the blocking of the primary filter. Furthermore, the use of a coarse pre-filter means that the sizes of particles reaching the primary filter will be of more uniform diameter than if the pre-filter was not present, because all particles reaching the primary filter will have diameters less than the diameter of the pores in the pre-filter. It has been found that particulate material of more uniform diameter is more resistant to binding than particulate material of greatly varying diameter. This further reduces the tendency of the primary filter to become blocked because the particulate matter incident on it is less inclined to bind together to form the conglomerated masses of dust and debris particles which are responsible for the blocking up of the filter. In this way, the majority of particles of dust or debris incident on the primary filter will fall away from the surface thereof and can be collected.

Preferably, the diameter of the pores of the pre-filter is set at a substantially uniform value, preferably at a value within the range 0.75 mm to 1.75 mm and in particular a value of 1 mm. It would generally be expected that using such large diameter pores would not deflect particulate matter of smaller size, such as average sized dust particles from the airflow.

However, the pre-filter with an array of substantially uniform diameter pores with a diameter set at a value within this preferred range serves to deflect a significant amount of particles of dust and debris picked up in a standard manner by a vacuum cleaner and entrained in an airflow passing through it irrespective of the particle size. When the particles entrained in the airflow hit the pre-filter, their momentum is reduced or eliminated and the airflow is often insufficiently strong to recapture such particles which then fall out of the airflow and can be collected. This significantly reduces the volume of particulate material which reaches the primary filter and so will reduce blocking of the primary filter further.

The primary filter comprises a concertina shaped arrangement of a fine filter material in order to provide a high surface area and low volume primary filter. It is preferred that the primary filter comprises a frame comprising two opposing arrays of arms and that the concertina shaped arrangement of fine filter material is supported between opposing pairs of the arms. This support for the fine filter material enables more inexpensive and flexible fine filter material to be used because the filter material is supported in the concertina formation and so does not have to maintain this formation due to its own rigidity. In a preferred arrangement, the opposing arrays of arms are each arranged to form a corrugated or zig-zag formation and so are conveniently positioned to support the entire length of the opposing sides of a strip of filter material folded into a concertina formation. To further increase the surface area of the primary filter without increasing its volume it is preferred that additional pieces of fine filter material are located between adjacent arms of the arrays of arms. To ease manufacture, it is preferred that the frame of the primary filter comprises a molded plastic material.

In order to reduce the volume taken up by the dual filter arrangement without decreasing its performance, it is preferred that the pre-filter is formed with a recess within which the primary filter is received. In a preferred embodiment the pre-filter comprises an open box shaped structure in which the array of pores is located in at least one of the sides of the structure and more preferably the array of pores is located in all five sides of the structure.

The pre-filter may conveniently be made from a molded plastic material. Preferably, this material comprises a low friction material, such as polypropelene, and may be an antistatic compound such as achieved by mixing carbon with polypropelene. In order to provide a seal between the pre-filter and co-operating parts of the vacuum cleaner housing, and to ensure that all of the airflow within which dust and debris is entrained passes through the dual filter arrangement, the pre-filter has a peripheral rim. The peripheral rim is used to couple the pre-filter to the primary filter and/or to a housing part of a vacuum. Preferably, a peripheral seal element made of a resilient material surrounds said rim.

The seal element comprises a first rearwardly extending resilient portion which extends around the periphery of the rim of the pre-filter towards the primary filter, and which surrounds the periphery of the primary filter when the dual filter arrangement is fitted to a vacuum cleaner. This helps to provide a closure between the peripheries of the pre-filter and the primary filter. This seal is effectively formed by ensuring that the first rearwardly extending resilient portion extends rearwardly beyond the primary filter to engage a first housing part of a vacuum cleaner to form a seal therewith when the dual filter arrangement is fitted to a vacuum cleaner. This arrangement also provides a seal between the dual filter arrangement and the first housing part.

It is further preferred that the seal element comprises a second rearwardly extending resilient portion. This second portion extends around the periphery of the rim of the pre-filter towards the primary filter to engage a peripheral rim of the primary filter, to thus form a seal therewith when the dual filter arrangement is fitted to a vacuum cleaner. This provides further sealing between the pre-filter and the primary filter to prevent dust laden airflow leaking therebetween.

In a preferred embodiment the seal element may comprise a substantially radially outwardly extending resilient portion which extends around the periphery of the rim of the pre-filter. This resilient portion engages a second housing part of a vacuum cleaner to form a seal therewith when the dual filter arrangement is fitted to a vacuum cleaner. Preferably, a radially inwardly extending wall is provided on the second housing part of the vacuum cleaner, and a front facing surface of the radially outwardly extending resilient portion engages a rearwardly facing surface of the wall to form a seal therebetween. It is further preferred that, in use of the vacuum cleaner, the seal between the radially outwardly extending resilient portion and the radially inwardly extending wall is reinforced by a pressure differential generated by an underpressure area located in front of the dual filter arrangement.

Alternatively, the sealing element may comprise a substantially radially outwardly extending resilient portion which extends around the periphery of the rim of the pre-filter. The periphery of the radially outwardly extending resilient portion is arranged such that it does not engage the second housing part of the vacuum cleaner when the vacuum cleaner is not in use but, when the vacuum cleaner is in use, a pressure differential is generated by an underpressure area located in front of the dual filter arrangement. This pressure differential urges the periphery of the radially outwardly extending resilient portion into engagement with the second housing part to form a seal therewith. Since the seal is not in frictional engagement with the second housing part when the second housing part is removed, it provides for easier removal of that second housing part.

The second housing part referred to may comprise the wall of a removable nose cone of the vacuum cleaner through which dust and debris are sucked into the vacuum cleaner. The seal element may be made of any resilient sealing material, such as rubber, neoprene, silicones or other suitable elastomers. Conveniently, the seal element may by molded around the periphery of the rim of the pre-filter. An advantage of this construction is that the operator is not required to physically handle the dual filter assembly when removing and emptying the removable nose cone. Still another advantage is that the mounting of the dual filter assembly on the first housing part allows the capacity of the nose cone to be increased. This arrangement further limits the possibility of the dust and dirt within the nose cone from coming in contact with the dual filter assembly when the nose cone is being emptied. Still further, the dual filter assembly itself is easier to clean because the assembly is mounted on the first housing part, which means that less handling of the assembly will be required by the user.

In a preferred embodiment of the present invention the pre-filter is releasably latched to a first housing portion of a vacuum cleaner by a latching arrangement against a biasing force generated by the seal element. Preferably, at least one cam surface is located between co-operating latching parts of the latching arrangement. The movement of at least one of the latching parts over the cam surface during the unlatching movement causes the seal element to be compressed beyond the degree of compression of the seal element when the pre-filter is latched to the first housing portion. Thus, the seal element has the dual function of providing sealing and of providing resilient biasing of the latching arrangement, thus providing a potential reduction of component parts.

In a preferred embodiment at least one keyhole shaped aperture is provided in the rim of the pre-filter. The keyhole shaped aperture is used to releasably receive a co-operating latch element which extends from the first housing portion. The latch element may comprise a peg with an enlarged head which can fit within the widened portion of the aperture and a stem which can fit within the narrow portion of the aperture. In this preferred embodiment the cam surface may surround the aperture and may comprise at least one ridge over which the co-operating latch element must ride when moving into or out of the latched position.

Preferably, the primary filter has a peripheral rim via which it is releasably latched between the pre-filter and the first housing portion. The first housing portion of the vacuum cleaner referred to above may be a housing portion which surrounds an inlet to a fan of the vacuum cleaner.

According to a second aspect of the present invention there is provided a concertina filter arrangement for a vacuum cleaner for filtering particles of dust and debris from an airflow passing through the vacuum cleaner. The concertina filter arrangement comprises a frame and a concertina shaped arrangement of filter material. The concertina shape of the filter material is supported in and maintained by the frame, preferably along opposing zig-zag edges of the filter material. The concertina filter may have the preferred features of the concertina shaped primary filter arrangement described above. Such a concertina filter can be made of relatively inexpensive and flexible fine filter material because the concertina shape is supported by the frame and not by the filter material itself.

According to a third aspect of the present invention there is provided filter arrangement for a vacuum cleaner in which the filter has a peripheral rim via which it is fitted to a first housing part of a vacuum cleaner, and wherein a peripheral seal element made of a resilient material surrounds the rim. Preferably, the seal element comprises a first rearwardly extending resilient portion which extends around the periphery of the rim of the filter towards the first housing part to form a seal therewith when the filter arrangement is fitted to a vacuum cleaner. The seal element may additionally or alternatively have a radially outwardly extending resilient portion according to any preferred embodiment described above in relation to the seal element of the first preferred embodiment of the present invention.

According to a fourth aspect of the present invention there is provided a filter arrangement for a vacuum cleaner in which the filter has a seal element made of a resilient material for sealing against a housing part of a vacuum cleaner, and wherein the filter can be releasably latched to a housing portion of a vacuum cleaner by a latching arrangement against a biasing force generated by the seal element. The fourth aspect of the present invention has the same preferred features and advantages as described above in relation to the latch arrangement for the pre-filter of the first described embodiment of the present invention.

According to further aspects of the present invention there is provided a vacuum cleaner comprising any one of the filter arrangements described above according to the first, second, third or fourth aspects of the present invention. In a preferred form the vacuum cleaner may comprise a first housing portion which houses a battery pack, a motor and a fan, and a second housing portion which comprises a nose cone. The battery pack powers the motor which rotatingly drives the fan to generate an airflow which enters the vacuum cleaner through the nose cone and passes through the dual filter arrangement into the fan.

BRIEF DESCRIPTION OF THE DRAWINGS

The various advantages of the present invention will become apparent to one skilled in the art by reading the following specification and subjoined claims and by referencing the following drawings in which:

FIG. 1 shows a longitudinal cross-section of a hand held battery powered vacuum comprising a dual filter system according to a preferred embodiment of the present invention;

FIG. 5 shows a side perspective view of a pre-filter used in the dual filter system of the vacuum cleaner of FIG. 1;

DETAILED DESCRIPTION OF THE PREFERRED EMBODIMENTS

Figure 2:
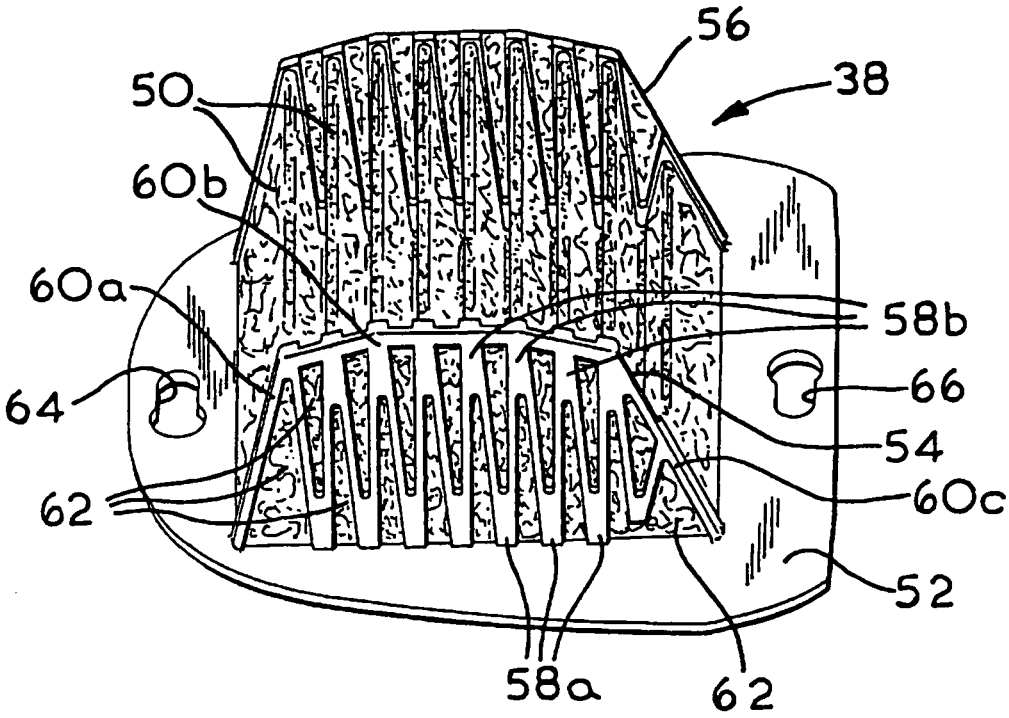
FIG. 2 shows a front perspective view of a primary filter used in the dual filter system of the vacuum cleaner of FIG. 1.
Figure 3:
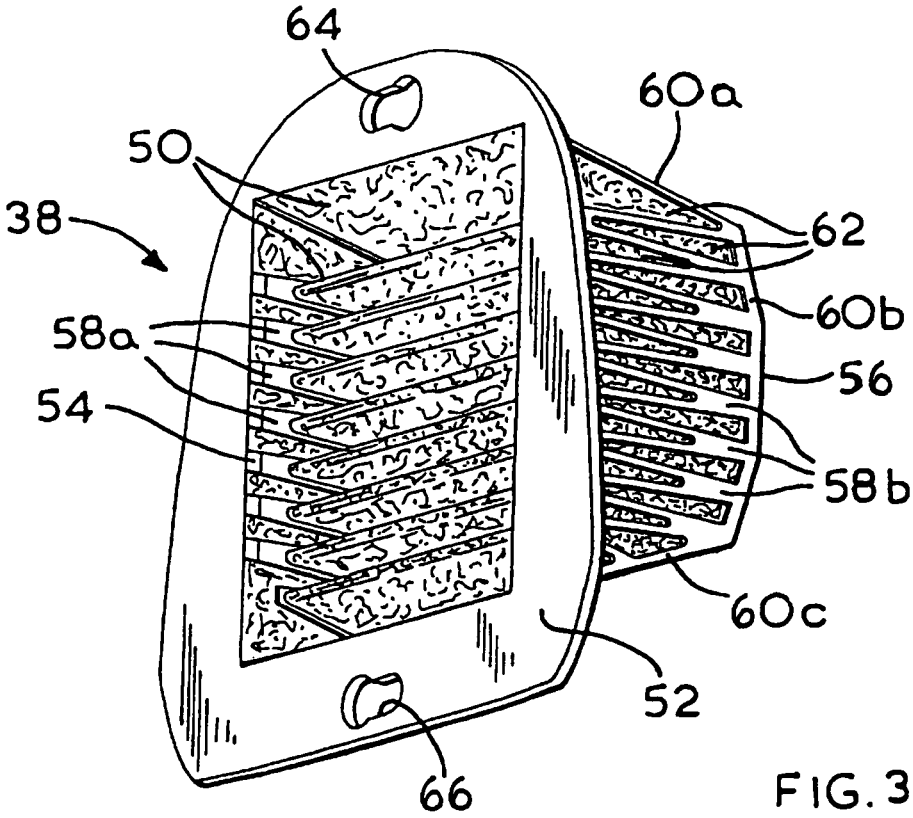
FIG. 3 shows a rear perspective view of the primary filter shown in FIG. 2.
Figure 4:
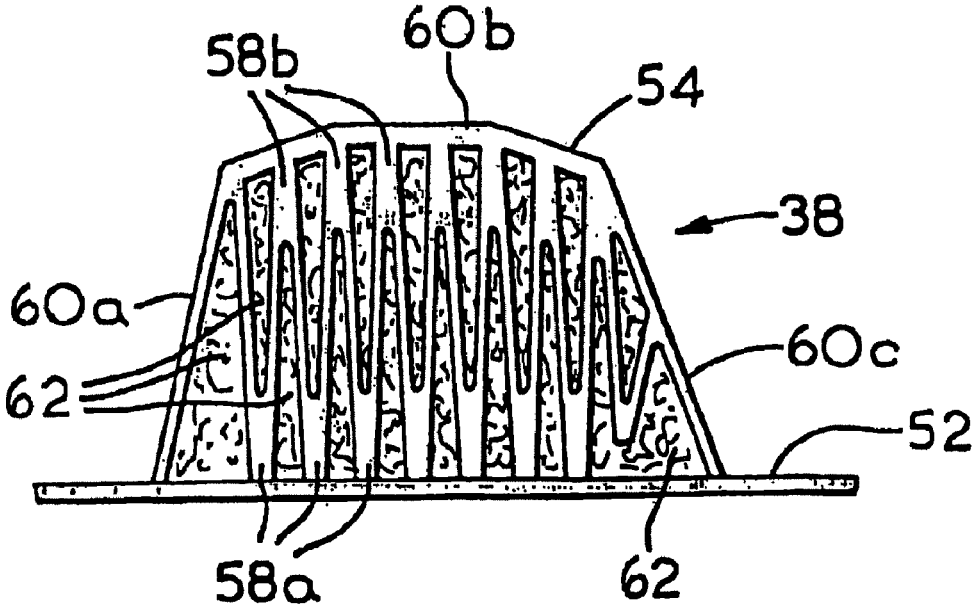
FIG. 4 shows a side view of the primary filter shown in FIGS. 2 and 3.
Figure 6:
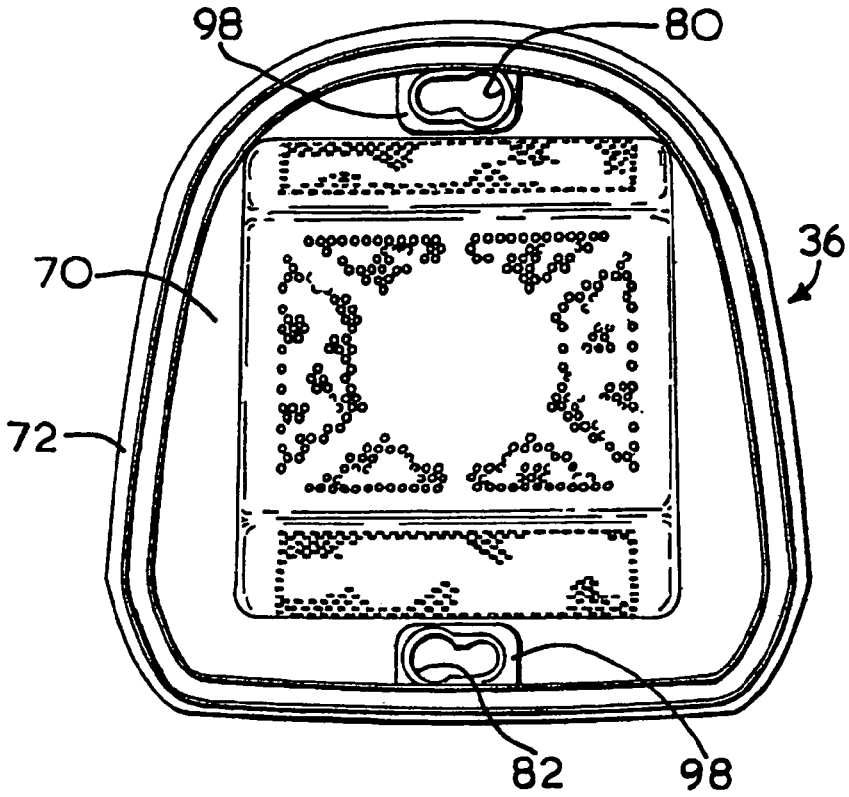
FIG. 6 shows a bottom view of the pre-filter shown in FIG. 5.

Referring to FIG. 1, there is shown a preferred embodiment of a battery powered hand held vacuum cleaner (1) in accordance with the present invention. The vacuum cleaner (1) generally comprises a main housing portion (2) and a nose cone (4) and can be releasably mounted on a charging unit (6) in a known manner. The charging unit (6) can optionally be mounted on a wall for storage and re-charging of the vacuum cleaner.

The main housing portion (2) comprises a handle (8) and houses a motor (10) which is powered by a re-chargeable battery unit (12) also housed within the main housing portion. When the vacuum cleaner is mounted on the charging unit (6), the battery unit (12) is electrically connected to the charging unit to charge the battery unit. For this purpose the charging unit (6) can be connected to a mains electricity supply via an electrical cable (14). The motor (10) is switched on and off by movement of an actuator (16) which is slidably mounted on the main housing portion (2). The actuator (16) operates a switch unit (18) which switches the motor (10) on and off.

The motor (10) rotatingly drives a fan (20). When the fan (20) is rotated by the motor (10) it draws air into it axially from the front of the fan through an inlet (84) provided in the front of the main housing portion (2), as indicated by arrows (A). The fan (20) expels air radially, as indicated by arrows (B). The air expelled by the fan (20) exits the main housing portion (2) via vents (not shown) provided in the housing portion. A dual filter system (34) which comprises a pre-filter (36) and a primary filter (38) is releasably latched onto the front of the main housing portion (2) in front of the inlet (84) to the fan (20) by a pair of pegs (40) which extend from the front of the main housing portion. The pegs (40) have enlarged heads and can be releasably latched within a corresponding pair of keyhole shaped apertures provided in the pre-filter (36) and in the primary filter (38) in a manner described in more detail below.

The nose cone (4) can be releasably fitted onto the main housing portion (2) by the engagement of detent members (22,24) provided on the main housing portion with co-operating recesses (26,28) provided in the nose cone. Detent member (24) can be retracted from recess (28) by depressing a release lever (30) against the force of a biasing spring (32) in order to remove the nose cone (4) from the main housing portion (2). The nose cone (4) comprises an inlet tube (42) for the ingress of dust and debris to be collected by the vacuum cleaner. At the rear end of the inlet tube (42) is provided a deflector (44) for deflecting dust and debris downwardly into a collecting chamber (46) provided in the nose cone (4).

In use when the vacuum cleaner (1) is detached from the charging unit (6) and the motor (10) is switched on, the impeller [(12)] (*20*) rotates to draw an airflow into the front end (48) of the inlet tube (42), along the inlet tube (42) through the dual filter system (34) and axially into the fan (20). The front end (48) of the inlet tube is directed by a user towards a surface from which dust and/or other debris is to be collected. The airflow generated by the fan (20) entrains dust and debris within it which is pulled up the inlet tube (42), and a portion thereof is deflected downwardly with the airflow by the deflector (44) towards collecting chamber (46). In this way some of the dust and debris entrained in the airflow will be removed from the airflow and collected within the collecting chamber (46). The remainder of the dust and debris entrained within the airflow will be separated from the airflow by the dual filter system (34). The proportion of dust and debris separated from the airflow by the pre-filter (36) will drop downwardly, due to gravity, and will be collected in the collecting chamber (46) of the nose cone (4). The remaining, relatively small, proportion of the dust and debris separated from the airflow by the primary filter (38) will be collected in the space between the pre-filter (36) and the primary filter (38).

When a user has collected a pre-determined amount of dust and debris or has completed a cleaning task, the motor (10) will be switched off and the nose cone (4) removed from the main housing portion (2) by depressing the release lever (30). The dust and debris contained in the collecting chamber (46) can then be disposed of. Also, the dual filter system (34) can be removed as required by the operator from the main housing portion (2). Any dust or debris collected on or between the pre-filter (36) and the primary filter (38) can then be removed. The dual filter system (34) and nose cone (4) can then be re-fitted onto the main housing portion (2) and the vacuum cleaner (1) is ready for further use or can be stored away for subsequent use.

One of the benefits of the arrangement utilizing a dual filter attached to the main housing portion (2) is that this design provides for relative ease of emptying and cleaning the vacuum cleaner. In particular, the user may hold the housing unit in one hand while removing the collecting chamber [(26)] (*46*) with an opposed hand, the dust and debris being primarily retained within the collecting chamber (46) and thus can be emptied at the operator's convenience. No additional step is required to remove the prefilter or primary filter from the main housing or from the nose cone (4). Any debris collected between the primary filter and the pre-filter can simply be removed by vibrating or shaking the housing unit with the filters attached thereto. This enables a continuous operation to empty the vacuum cleaner. It also eliminates the need for the user to handle the dual filter system (34) when emptying the nose cone (4), and the possibility of further contaminating the filter system during emptying of the nose cone.

Still another advantage of the vacuum cleaner (1) of the present invention is that by mounting the dual filter system (34) on the main housing portion (2), rather than within the nose cone (4), the capacity of the nose cone for containing dust and dirt debris is increased. In contrast, previously developed systems have incorporated the filter element within the removable nozzle or like element, which significantly reduces the capacity of the nozzle for holding contaminants. It will be appreciated, however, that the dual filter assembly could be mounted within the nozzle cone (4) with little modification to the nozzle cone.

The dual filter system (34) will now be described in more detail with reference to FIGS. 1 to 13. The primary filter (38) of the dual filter system (34) shown in FIG. 1 comprises a molded plastic frame within which is supported an accordian-like section or "concertina" of woven polyester filter material (50). The molded plastic frame comprises a rim (52) from which extend two opposing side support frames (54, 56). Each side support frame (54, 56) comprises an outer frame (60a, 60b, 60c) within which are formed an array of lower forked support arms (58a) and an array of upper forked support arms (58b) which co-operate in a zig-zag formation. The concertina of filter material (50) is supported between the zig-zag formation of opposing support arms (58a, 58b) and by the end support arms (60a, 60c) of the outer frame. In addition, triangular shaped sections of woven polyester filter material (62) are supported between adjacent support arms (58a), adjacent support arms (58b), adjacent support arms (60a, 58a) and adjacent support arms (60c, 58a). The triangular sections of filter material (62) provide a side filter surface across the area contained within the outer frame (60a, 60b, 60c) of each support frame (54, 56).

The primary filter (38) is manufactured by folding a concertina of filter material (50) within and locating triangular sections of filter material (62) appropriately within a molding die and then injecting plastic material into the molding die to form the molded plastic frame comprising rim (52) and opposing support frames (54,56). The opposing support frames support the woven filter material (50, 62) securely in position. The folding of the filter material (50) in the concertina arrangement and the additional triangular sections of filter material (62) provides a primary filter (38) with a relatively large cross-sectional area.

The rim (52) of the primary filter (38) has formed within it on opposing sides keyhole shaped apertures (64,66). The keyhole apertures are used to releasably latch the primary filter (38) to co-operating pegs (40) provided on the front of the main housing portion (2) of the vacuum cleaner of FIG. 1.

Figure 7:
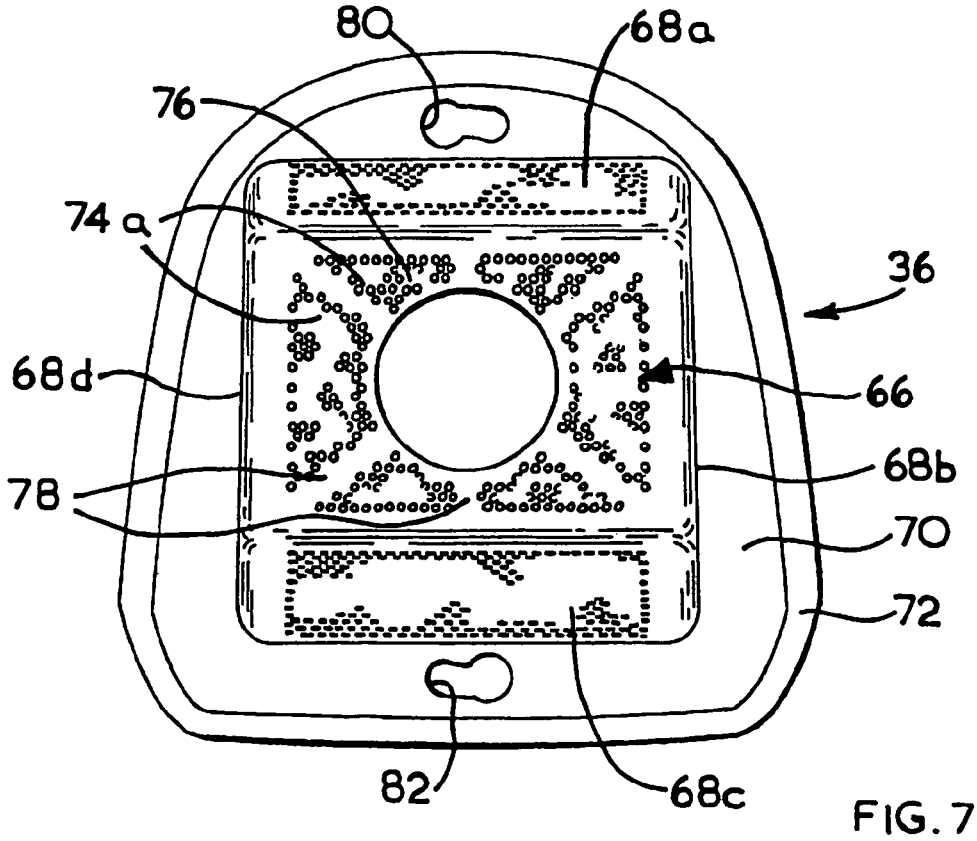
FIG. 7 shows a top view of the pre-filter shown in FIGS. 5 and 6 and shows an array of filter holes provided in the front surface of the pre-filter.
Figure 8:
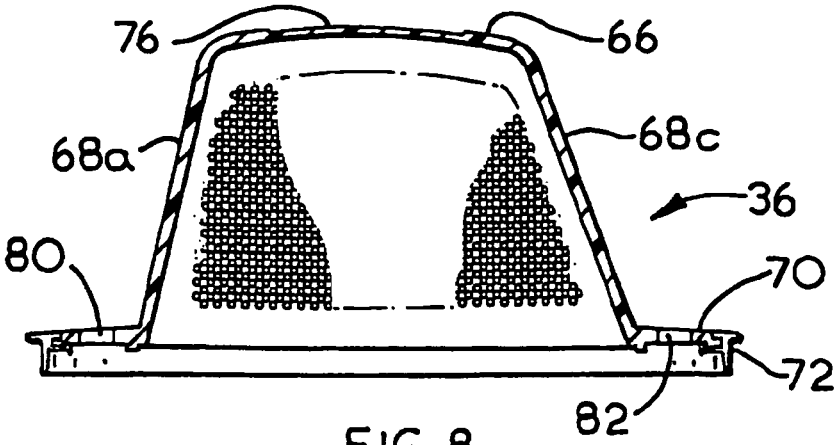
FIG. 8 shows a longitudinal cross-section of the pre-filter shown in FIGS. 5 to 7.
Figure 9:
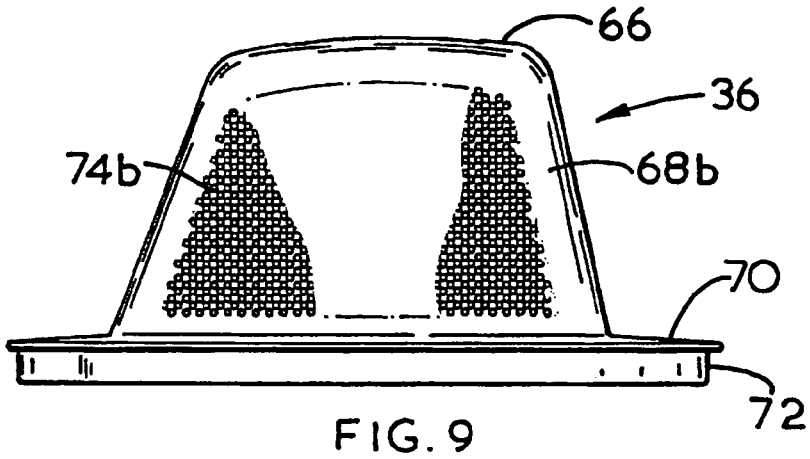
FIG. 9 shows a side view of the pre-filter shown in FIGS. 5 to 8 and shows an array of filter holes provided in all the side surfaces of the pre-filter.

As shown in FIG. 1, in use the primary filter (38) is surrounded by a pre-filter (36) shown in FIGS. 5 to 9. The pre-filter (36) comprises a molded plastic open box-shaped casing having front surface (66) and four side surfaces (68a to 68d), and a rim (70). A resilient seal element (72) extends around the periphery of the rim (70). The front surface (66) and the four side surfaces each have formed through them an array (74) of circular filter holes, for example, the array of filter holes (74a) formed in the front surface (66) as shown in FIG. 7 and the array of filter holes (74b) formed in the side surface (68b) as shown in FIG. 9. Each of the holes in the arrays of holes (74) has a diameter of approximately 1 mm although the size may vary, if required, between 0.75 mm and 1.75 mm. The arrays of holes in the pre-filter (36) provide a first "coarse" filtering stage in front of the primary filter which provides a second "fine" filtering stage.

To aid in the injection molding of the pre-filter (36), the front face (66) of the pre-filter comprises a solid circular region (76) from which extend radially outwardly six solid arms (78). The solid circular region (76) and arms (78) assist in the flow of molten plastic material during the injection molding process, which flow would otherwise be impaired by narrow channels between the holes forming the arrays of holes (74). The solid circular region (76) also provides a region of the pre-filter (36) that can prominently display information such as trademarks.

It has been found in practice that the 1 mm diameter size of the holes in the pre-filter (36) is generally greater than the majority of the particles of dust and debris entering the nose cone (4) in use of the vacuum cleaner shown in FIG. 1. However, the pre-filter (36) still deflects the majority of particles of dust and debris, irrespective of their size, out of the airflow drawn through the pre-filter (36) by the fan (20). These deflected particles of dust and debris are collected in the collecting chamber (46) of the nose cone (4). Up to 90% of particles of debris and dust normally picked up during household vacuuming and entrained in the airflow in front of the pre-filter (36) can be removed from that airflow by the pre-filter (36). However, the amount of particulate removed from the airflow is dependent on the size of that particulate.

The 1 mm diameter circular hole size used in the pre-filter (36) would be expected not to deflect the generally much smaller sized particles of dust and debris entrained in an airflow through it. However, when the particles of dust and debris entrained within the airflow hit the front surface of the pre-filter (36), the momentum of the particles is reduced or eliminated. The airflow into the pre-filter (36) is often insufficient to then recapture such particles and these particles fall into the collecting chamber (46). This significantly reduces the volume of particles of dust and debris which reach the primary filter (38). Consequently, there is a significant reduction in the amount of blocking of the pores of the filter material used therein by conglomerations of such particles. Furthermore, as the particles that reach the primary filter (38) will have passed through the 1 mm diameter holes in the pre-filter (36), they will be of more uniform diameter than if the pre-filter was not used. It has been found that this increased level of uniformity of diameter of particles incident on the filter material (50, 62) of the primary filter (36) is more resistant to binding and thus tends to reduce further the blocking up of the pores in the primary filter by conglomerations of particles. This is because particles of similar diameter are less likely to bind together to form a conglomerated mass that could block the filter material than particles of dissimilar diameters. The more uniform diameter particles that have passed through the pre-filter (36) tend not to bind and instead fall away from the filter material (50, 62) into the space between the pre-filter (36) and the primary filter (38). This reduction of blocking of the pores of the primary filter improves the suction of the vacuum cleaner (1) during use as the airflow to the fan (20) is not impeded by a blocked primary filter (38).

In a similar way to the primary filter (38), the rim (70) of the pre-filter (36) has formed within it on opposing sides keyhole shaped apertures (80, 82). These apertures (80, 82) are used to releasably latch the pre-filter (38) to co-operating pegs (40) provided on the front of the main housing portion (2) of the vacuum cleaner (1) of FIG. 1. When the primary filter (38) is received within the pre-filter (36), the keyhole shaped apertures (64, 80) and (66, 82) line up so that the dual filter system (34) comprising the pre-filter (36) and the primary filter (38) can be releasably latched to the main housing portion (2) as a single assembly.

To fit the dual filter system (34) to the main housing portion (2), the widened portions of the keyhole shaped apertures (64, 80) and (66, 82) are fitted over the enlarged head of a corresponding one of the pair of pegs (40). The dual filter system (34) is then rotated slightly to slide the stem of the pegs (40) into the narrow portion of the respective keyhole shaped apertures (64, 80) and (66, 82) in order to securely latch the dual filter system (34) to the main housing portion (2) over the inlet (84) to the fan (20). One of the pegs (40) comprising an enlarged head (86) and a stem (88) is shown clearly in dotted lines in FIG. 10.

Figure 10:
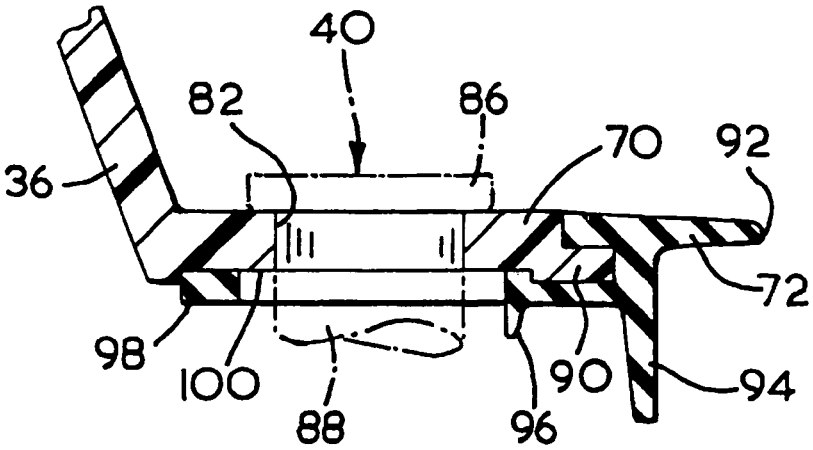
FIG. 10 shows an enlarged longitudinal cross-section of a portion of the rim of the pre-filter shown in FIGS. 5 to 9 and its associated seal element.

FIG. 10 shows in more detail the resilient seal element (72) which surrounds the rim (70) of the pre-filter (36). The seal element (72) is made of a resilient material such as rubber, silicone, neoprene or any other suitable elastomer. The seal element (72) is intended to form an air tight seal between the pre-filter (36) and the primary filter (48), between the dual filter system (34) and the nose cone (4), and between the dual filter system and the main housing portion (2).

The rim (70) has a stepped portion (90) which extends around its periphery and the resilient seal element (72) is molded over this stepped portion. The seal element (72) comprises a radially outwardly extending portion (92) which, as seen in FIG. 1, engages the inner surface of the wall of the nose cone (4), when the nose cone is fitted to the main housing portion (2). This forms an airtight seal between the dual filter system (34) and the nose cone. The seal element also comprises a first axially rearwardly extending portion (94) (FIG. 10) which extends around the periphery of the rim (52) of the primary filter (38) to engage a forward surface of the main housing portion (2) to form an airtight seal between the dual filter system (34) and the main housing portion. As a consequence, an airtight seal is also formed between the pre-filter (36) and the primary filter (38). The seal element (72) further comprises a second axially rearwardly extending portion (96) against which the rim (52) of the primary filter (38) abuts when the pre-filter (36) and primary filter (38) are together fitted onto the main housing portion. This provides further air tight sealing between the pre-filter (36) and primary filter (38). This sealing is further enhanced by extending the seal element (72) at the keyhole shaped apertures (80,82) so that an extension (98) (See also FIG. 6) of the seal element extends around each keyhole shaped aperture (80, 82) partly within a recess (100) formed in the lower side of the rim (70) around the apertures.

Thus, when the dual filter system (34) is assembled and fitted onto the main housing portion (2), the primary filter (38) is inserted into the pre-filter (38) such that the concertina of filter material (50) is received within the box-shaped cavity of the pre-filter, the keyhole shaped apertures (64, 80) and (66, 82) are aligned, the second axially extending portion (96) of the seal (72) abuts the rim (52) of the primary filter (38), and the first axially extending portion (94) of the seal (72) extends around the periphery of the rim (52) of the primary filter (38). The dual filter system (34) is then latched onto the pegs (40) provided on the main housing portion (2). This latching of the dual filter system (34) to the pegs (40) presses the rims (52, 70) of the filters together and so reinforces the seal between the pre-filter (36) and primary filter (38) provided by the portion (96) of the seal element (72). It also presses the rim (70) of the pre-filter (36) towards the front surface of the main housing portion (2) and thus reinforces the seal between the pre-filter and the main housing portion provided by the portion (94) of the seal element (72).

Figure 11:
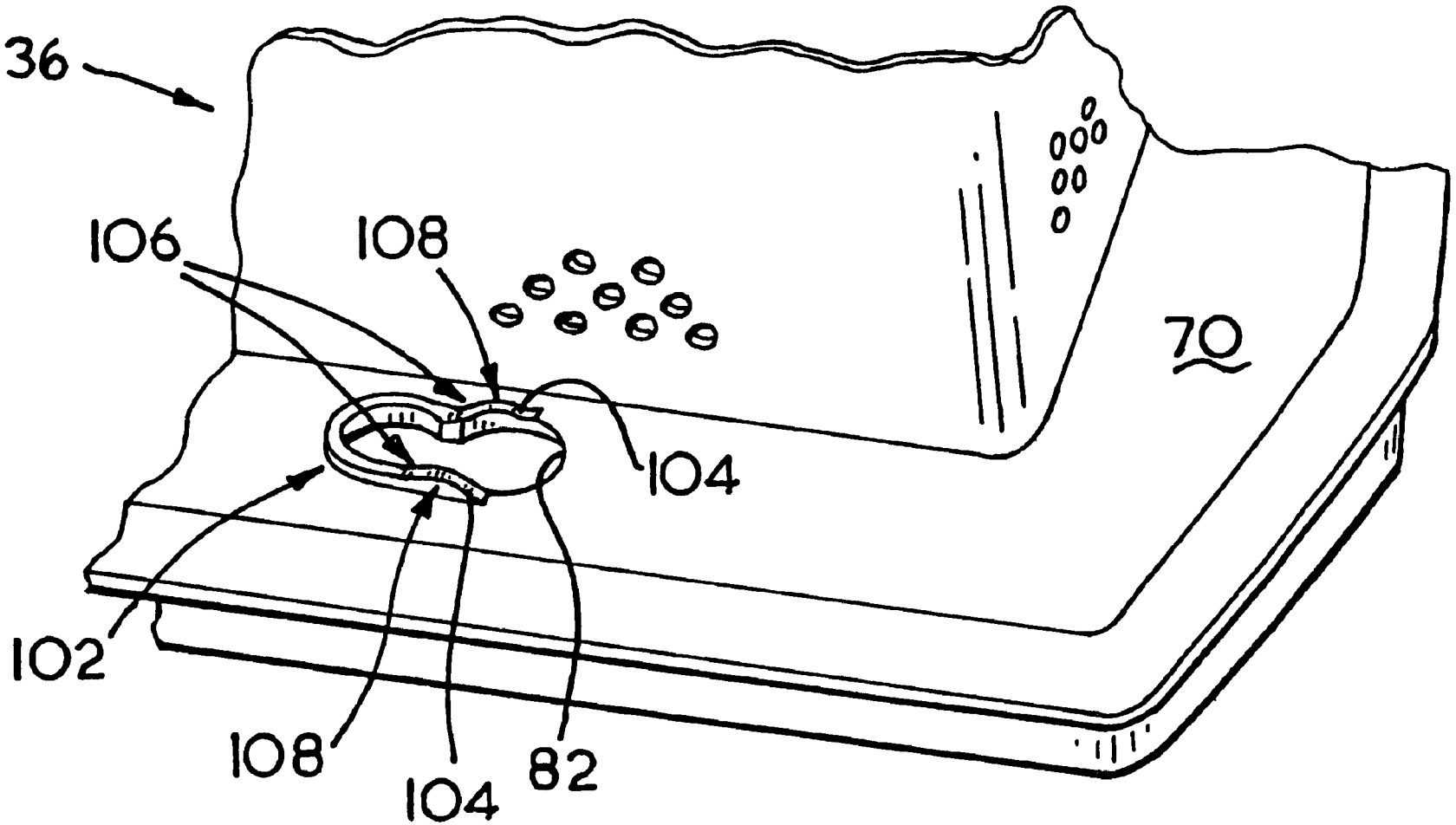
FIG. 11 shows a side perspective view of a portion of the upper surface of a rim of an embodiment of a pre-filter similar to that shown in FIGS. 5 to 10.

An alternative preferred embodiment of pre-filter (38) which provides an improved releasable latch connection between the dual filter system (34) and the main housing unit (2) of the vacuum cleaner of FIG. 1 is shown in FIG. 11. In the arrangement of FIG. 11, a raised cam surface (102) is provided on the upper surface of the rim (70) of the pre-filter (38) bordering the narrow portion and part of the widened portion of each keyhole shaped aperture (80, 82). Each cam surface (102) comprises a pair of ramps (104) facing towards the widened end of the aperture it borders and an opposing pair of ramps (106) facing towards the narrow end of the aperture it borders. Each cam surface (102) co-operates with the underside of the enlarged head portion (86) of a respective peg (40). When the dual filter system (34) is fitted over the pair of pegs (40) provided on the main housing portion (2), the enlarged head portion (86) passes through the widened portion of the respective key shaped apertures (64, 80) and (66, 82). Then the dual filter system (34) is rotated by a small amount so that the neck portion of each peg (40) slides into the narrow portion of the respective apertures and the enlarged head portion (86) of each peg latches the dual filter system onto the main housing portion (2).

With the improved arrangement shown in FIG. 11, rotation of the dual filter system (34) in this way causes the underside of the enlarged head (86) of each peg to ride up the pair of ramps (104) on the respective cam surface (102). This urges the rim (70) of the pre-filter (36) towards the main housing portion (2) and thus towards the rim (52) of the primary filter (38) against the biasing force of the axially extending portions (94, 96) of the seal element (72). Further rotation of the dual filter system (34) causes the underside of the enlarged head (84) of each peg to move down the opposing ramps (106) and come to rest in its final latched position against the flat raised portion of the cam surface (102) surrounding the narrowed portion of each aperture (80, 82). This slightly releases the compression of the axially extending portions (94, 96) of the seal element (72). However, with the dual filter system (34) in its latched position, the rim (70) of the pre-filter system is urged sufficiently towards the main housing portion (2) and towards the rim (52) of the primary filter (36) for the axially extending portions (94, 96) to form an air tight seal against the main housing portion and the rim (52) respectively. This ensures that in use of the vacuum cleaner (1) all airflow to the fan (20) passes through the pre-filter (36) and through the primary filter (38). Furthermore, the two ridges (108) on each cam surface (102) between the opposing ramps (104, 106) serve as a retaining means to retain the pegs (40) in their latched position against the resilience of the axially extending portions (94, 96) of the sealing element (72). In this way the dual filter system (34) can only be unlatched from the pegs (40) by rotation in a direction opposite to that required to latch the dual filter system to the pegs, which rotation can only occur if a force is applied which is sufficient to compress the axially extending portions (94, 96) so that the underside of the enlarged heads (86) of the pegs (40) can ride over the ridges (108) in the cam surfaces (102).

Alternatively, or in conjunction with the use of the cam surfaces (102), internal ribs may be provided around the interior surface of the collecting chamber (46). As the collecting chamber (46) is moved into engagement with the main housing portion (2), these ribs engage with the rim (70) of the pre-filter system and operate to compress the axially extending portions (94, 96) of the sealed element (72) into respective engagement with the main housing portion (2) and primary filter (36) accordingly. The use of ribs in this manner will provide a uniformly distributed compression force about the entire periphery of the seal of the pre-filter.

Figure 13:
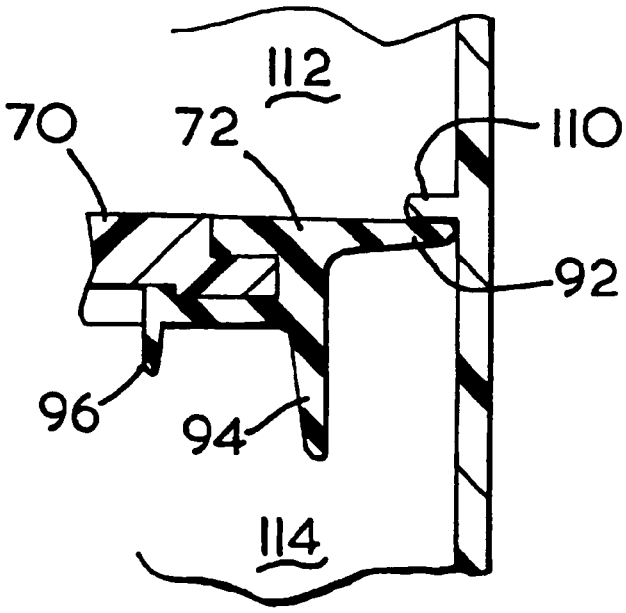
FIG. 13 shows a longitudinal cross-section of a portion the nose cone of the vacuum cleaner similar to that shown in FIG. 1 and an embodiment of a seal element for the rim of the pre-filter shown in FIGS. 5 to 11.

FIG. 13 shows a cross-section of the seal element (72) shown in FIG. 10, with like parts identified by like numerals. FIG. 13 also shows a modified portion of the outer wall of the nose cone (4) adjacent the seal element (72) from that shown in FIG. 1. In the FIG. 13 embodiment, an internal raised wall (110) extends around the portion of the internal surface of the nose cone (4) which surrounds the seal element (72). This creates an improved air tight seal between the dual filter system (34) and the inner surface of the nose cone (4). The radially extending portion (92) of the resilient seal element (72) abuts the rear surface of the wall (110). In use of the vacuum cleaner the underpressure created in the forward part (112) of the nose cone (4) relative to the ambient air pressure in the region (114) in front of the main housing portion (2) reinforces a sealing engagement between the portion (92) of the sealing element (72) and the wall (110). The pressure differential urges the front surface of the resilient, radially extending portion (92) of the seal element (72) into sealing engagement with the rear surface of the wall (110). Again, this ensures that all the airflow through the nose cone (4) passes through the dual filter arrangement (34) into the fan (20).

Figure 12:
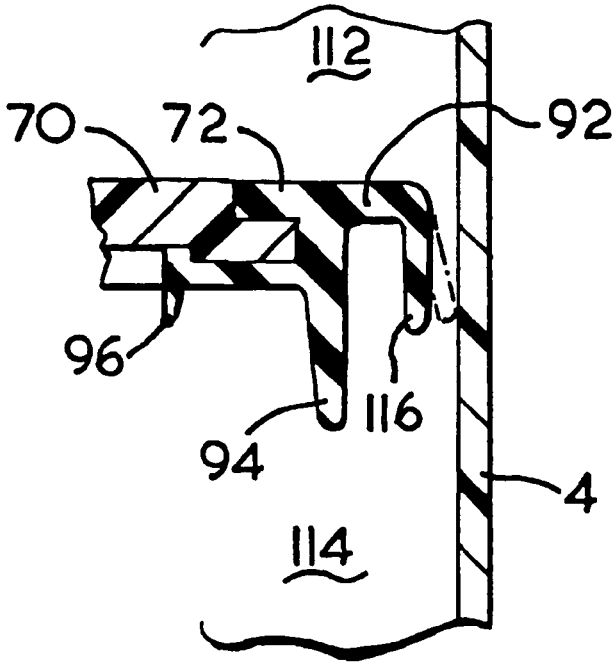
FIG. 12 shows a longitudinal cross-section of a portion the nose cone of the vacuum cleaner shown in FIG. 1 and an embodiment of a seal element for the rim of the pre-filter shown in FIGS. 5 to 11.

FIG. 12 shows an alternative preferred embodiment to that shown in FIG. 13, with like parts identified by like numerals. In this embodiment the wall (110) is not required on the internal surface of the nose cone (4), and the radially extending portion (92) of the seal element (72) is bent rearwardly to form [and] *a* third axially rearwardly extending portion (116). In FIG. 12, the radially extending portion (92) is bent rearwardly through approximately 90°. Thus, as shown in solid lines in FIG. 12, when the nose cone (4) is fitted on the main housing portion (2) with the vacuum cleaner switched off, there is no sealing engagement between the seal element (72) and the nose cone (4). However, when the vacuum cleaner is switched on, the pressure differential between the underpressure created in the region (112) of the nose cone (4) and the ambient pressure in the region (114) causes the third resilient axially extending portion (116) to move outwardly into the position showed in FIG. 12 in dotted lines. In this position, the third resilient, axially extending portion (116) is urged into sealing engagement with the internal surface of the wall of the nose cone (4). Thus, when the vacuum is in use a seal is provided between the dual filter system (34) and the nose cone (4) to ensure that all the airflow through the nose cone passes through the dual filter system (34). However, when the vacuum cleaner (1) is not in use, the lack of engagement between the seal element (72) and the nose cone (4) can help to prevent wear of the portion (116) of the seal element due to the repeated removal and replacement of the nose cone (4) during the lifetime of the vacuum cleaner.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

[1. A hand held vacuum cleaner for filtering particles of dust and debris from an airflow passing through the vacuum cleaner, comprising;

a coarse pre-filter;

a fine primary filter which is located downstream of the pre-filter in the direction of flow of the airflow; and wherein the pre-filter has a recess for receipt of the primary filter.]

[2. The vacuum cleaner of claim 1, wherein the diameter of the pores of the pre-filter is set at a substantially uniform value.]

[3. The vacuum cleaner of claim 2, wherein the diameter of the pores of the pre-filter is set at one substantially uniform value within the range approximately 0.75 mm to 1.75 mm.]

[4. The vacuum cleaner of claim 3, wherein the diameter of the pores of the pre-filter each comprise a substantially uniform value of approximately 1 mm.]

[5. The vacuum cleaner of claim 1, wherein the primary filter comprises a concertina shaped arrangement of a filter material.]

[6. The vacuum cleaner of claim 5, wherein the primary filter comprises a frame and the concertina shaped arrangement of a fine filter material and the concertina shape of the filter material is supported in and maintained by the frame.]

[7. The vacuum cleaner of claim 6, wherein the frame includes two opposing arrays of arms and the concertina shaped arrangement of the filter material is supported between opposing pairs of said arms.]

[8. The vacuum cleaner of claim 7, wherein the frame of the primary filter comprises a molded plastics material.]

[9. The vacuum cleaner of claim 1, wherein the pre-filter is made from a molded plastic material.]

[10. The vacuum cleaner of claim 1, wherein the pre-filter has a peripheral rim via which is fitted to the primary filter and to a housing part of a vacuum cleaner, wherein a peripheral seal element made of a resilient material surrounds said rim.]

[11. A hand held vacuum cleaner system comprising:

a housing;

an electric motor disposed within said housing;

a fan driven by said electric motor for generating a suction airflow of air-entrained dirt and debris;

a dual filter system including:

a pre-filter for filtering coarse particles of dirt and debris from the dirt and debris entrained air;

a primary filter for filtering fine particles of dirt and debris from the entrained air;

said pre-filter forming an open ended box shape and said primary filter being adapted to rest nestably within said pre-filter;

said primary filter further comprising a concertina shaped filtering material; and said housing and at least one of said pre-filter and primary filter including cooperating latching structure for mechanically interengaging to releasably secure said pre-filter and said primary filter to said housing.]

[12. The vacuum cleaner of claim 11, wherein said pre-filter further comprises a resilient seal secured to a peripheral flange of said pre-filter.]

[13. The vacuum cleaner of claim 12, wherein said resilient seal operates to form a relatively airtight seal between said pre-filter and said housing when said dual filter system is secured to said housing.]

[14. The vacuum cleaner of claim 11, wherein said primary filter includes a frame having said concertina shaped filtering material integrally formed therewith such that said concertina shaped filtering material is supported by said frame and is not removable from said frame.]

[15. A hand held vacuum cleaner for filtering particles of dust and debris from an airflow passing through the vacuum cleaner, comprising;

a primary filter;

a pre-filter nestably housed adjacent to the primary filter; and wherein, the primary filter is located downstream of the pre-filter in the direction of flow of the airflow.]

[16. A hand held vacuum cleaner for filtering particles of dust and debris from an airflow passing through the vacuum cleaner, comprising;

a cup-shaped pre-filter; and a concertina-shaped primary filter disposed adjacent to the pre-filter.]

*17. A hand held vacuum cleaner having a vacuum source and a dual filter system for filtering particles of dust and debris from an airflow drawn through the vacuum cleaner by the vacuum source, comprising:*

*a coarse pre-filter forming an open ended shape defining side surfaces and an end surface and having pores formed on all of said side and end surfaces;*

*a fine primary filter which is located downstream of the pre-filter in the direction of flow of the airflow; and*

*wherein the primary filter is configured to be nestably received within the open end of the pre-filter so that the primary filter filters airflow drawn through all of the side and end surfaces of the pre-filter.*

*18. The vacuum cleaner of claim 17, wherein the diameter of the pores of the pre-filter is set at a substantially uniform value.*

*19. The vacuum cleaner of claim 18, wherein the diameter of the pores of the pre-filter is set at one substantially uniform value within the range approximately 0.75 mm to 1.75 mm.*

*20. The vacuum cleaner of claim 19, wherein the diameter of the pores of the pre-filter each comprise a substantially uniform value of approximately 1 mm.*

*21. The vacuum cleaner of claim 17, wherein the primary filter comprises a concertina shaped arrangement of a filter material.*

*22. The vacuum cleaner of claim 21, wherein the primary filter comprises a frame and the concertina shaped arrangement of a fine filter material and the concertina shape of the filter material is supported in and maintained by the frame.*

*23. The vacuum cleaner of claim 22, wherein the frame includes two opposing arrays of arms and the concertina shaped arrangement of the filter material is supported between opposing pairs of said arms.*

*24. The vacuum cleaner of claim 23, wherein the frame of the primary filter comprises a molded plastic material.*

*25. The vacuum cleaner of claim 17, wherein the pre-filter is made from a molded plastic material.*

*26. The vacuum cleaner of claim 17, wherein the pre-filter has a peripheral rim which is fitted to the primary filter and to a housing part of a vacuum cleaner, wherein a peripheral seal element made of a resilient material surrounds said rim.*

*27. A hand held vacuum cleaner system comprising:*

*a housing;*

*an electric motor disposed within said housing;*

*a fan driven by said electric motor for generating a suction airflow of air-entrained dirt and debris;*

*a dual filter system including:*

*a pre-filter for filtering coarse particles of dirt and debris from the dirt and debris entrained air;*

*a primary filter for filtering fine particles of dirt and debris from the entrained air;*

*said pre-filter forming an open ended shape defining side surfaces and an end surface and having pores formed on all of said side and end surfaces and said primary filter being adapted to rest nestably within said pre-filter for filtering airflow drawn through all of the side and end surfaces of the pre-filter;*

*said primary filter further comprising a concertina shaped filtering material; and*

*said housing and at least one of said pre-filter and primary filter including a cooperating latching structure for mechanically interengaging to releasably secure said pre-filter and said primary filter to said housing.*

*28. The vacuum cleaner of claim 27, wherein said pre-filter further comprises a resilient seal secured to a peripheral flange of said pre-filter.*

*29. The vacuum cleaner of claim 28, wherein said resilient seal operates to form a relatively airtight seal between said pre-filter and said housing when said dual filter system is secured to said housing.*

*30. The vacuum cleaner of claim 27, wherein said primary filter includes a frame having said concertina shaped filtering material integrally formed therewith such that said concertina shaped filtering material is supported by said frame and is not removable from said frame.*

*31. A hand held vacuum cleaner for filtering particles of dust and debris from an airflow passing through the vacuum cleaner, comprising:*

*a pre-filter having side surfaces and a bottom surface and having pores formed in all surfaces thereof; and*

*a second filter nestably disposed adjacent to the pre-filter and downstream of the pre-filter in the direction of airflow so that the second filter filters airflow drawn through all surfaces of the pre-filter;*

*wherein all of said airflow is filtered by said pre-filter.*

*32. The vacuum cleaner of claim 26 wherein the peripheral rim is provided with apertures for engaging pegs on the housing part of the vacuum cleaner to secure the pre-filter and the primary filter thereto.*

*33. The vacuum cleaner of claim 28 wherein the peripheral flange of said pre-filter is provided with apertures for engaging pegs on said housing for releasably securing said pre-filter and said primary filter to the housing.*

*34. The vacuum cleaner of claim 17 wherein all of said airflow is filtered by said pre-filter.*

*35. The vacuum cleaner of claim 27 wherein all of said airflow is filtered by said pre-filter.*

* * * * *